Aug. 2, 1960   G. SLAYTER   2,947,027
MANUFACTURE OF GLASS FIBERS
Filed Jan. 16, 1952   2 Sheets-Sheet 2
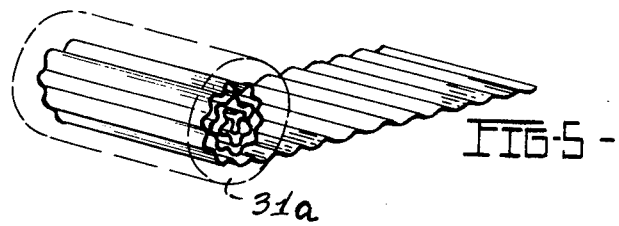
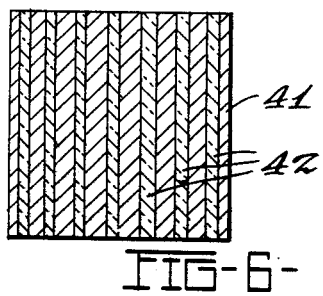
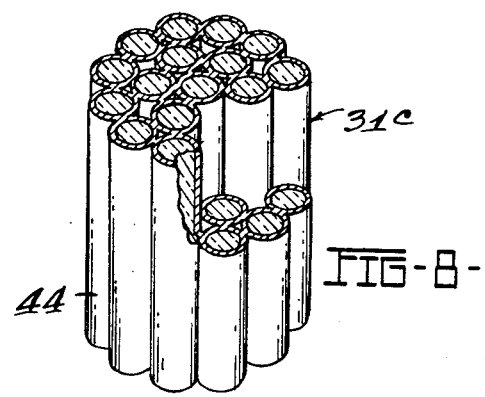
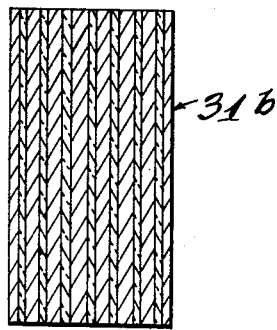
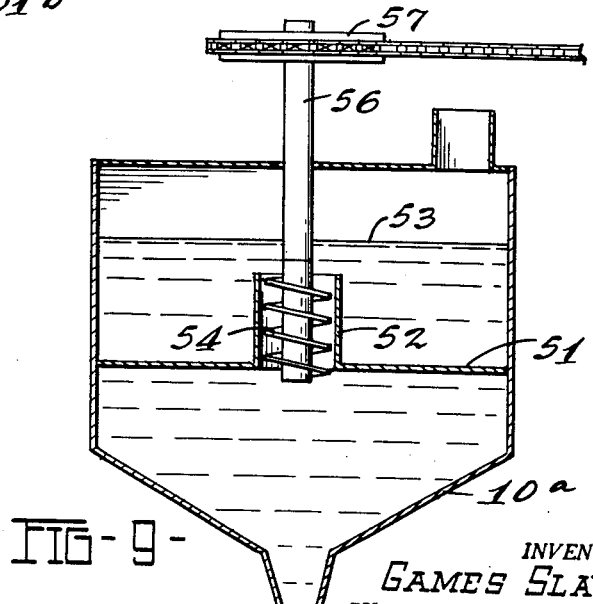
INVENTOR:
GAMES SLAYTER.
BY
ATTYS.

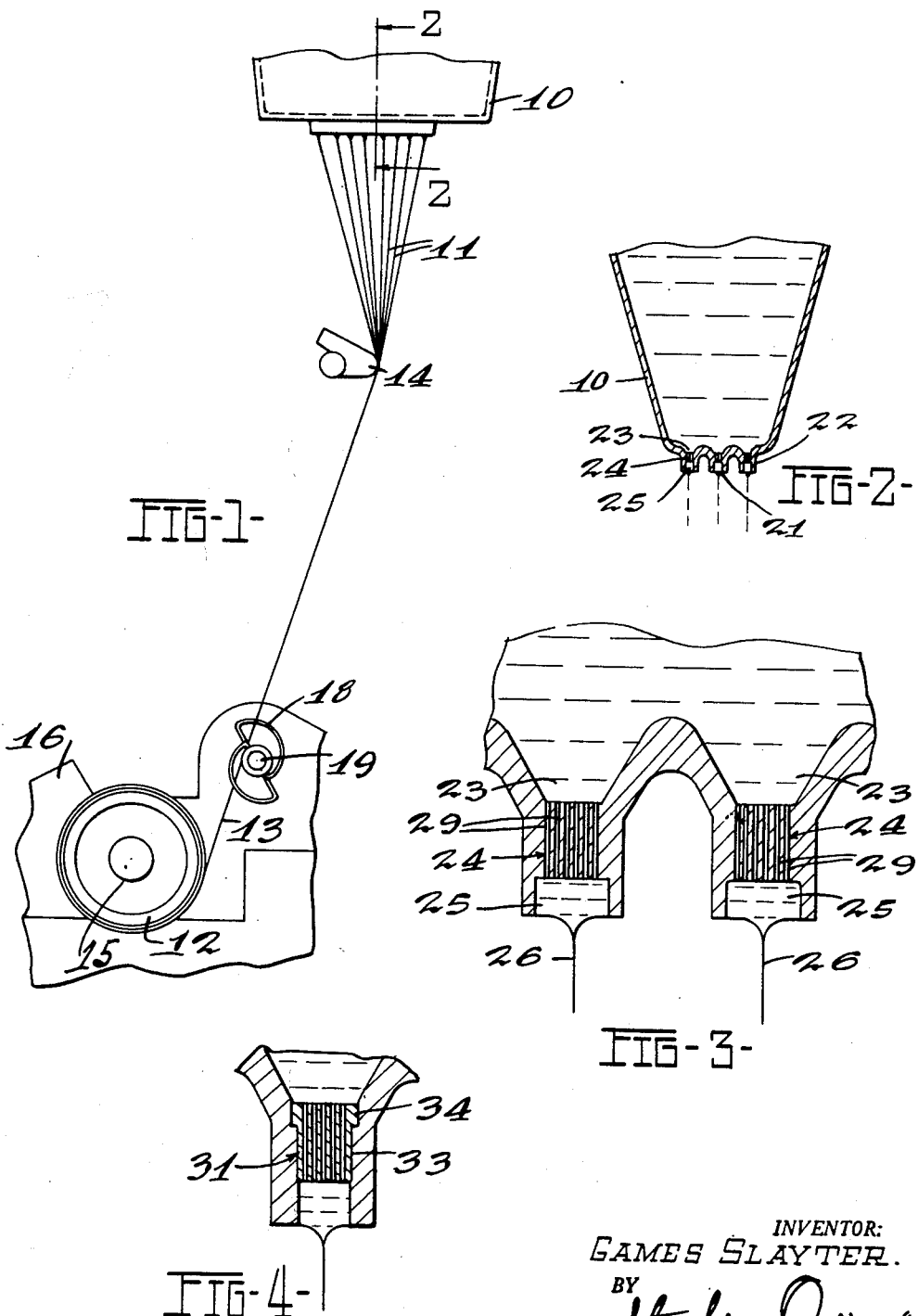

United States Patent Office 2,947,027
Patented Aug. 2, 1960

2,947,027

MANUFACTURE OF GLASS FIBERS

Games Slayter, Newark, Ohio, assignor to Owens-Corning Fiberglas Corporation, a corporation of Delaware Filed Jan. 16, 1952, Ser. No. 266,748

2 Claims. (Cl. 18—8)

This invention relates to the production of fibers from glass and other materials that in flowable state can similarly be drawn out into fibers.

It is an object of the invention to provide fibers of this kind of improved properties.

It is another object to so work the glass in fluid state and prior to attenuation of the glass into fibers that the glass is conditioned to increase the strength of the fibers made therefrom.

It is another object to string out the fluid glass into minute streamlets just prior to attenuation so that any crystalline or subcrystalline aggregates of molecules are oriented so as to extend all in the same direction, usually lengthwise of the fiber.

Another object of the invention is to provide a feeder for molten glass that strings out the glass into a multiplicity of minute streamlets as it forms the glass into the streams from which the fibers are attenuated.

It is still another object of the invention to provide a process of making glass fibers in which the glass is flowed into streams to be attenuated into fibers and in cooperation with this stream formation, the glass is subdivided into a multiplicity of minute streamlets that are then recombined and immediately attenuated into fibers.

The invention relates to the process in which glass in a molten condition is flowed into a plurality of streams and the streams are individually attenuated into fine fibers. Usually the fibers are then collected together into strands and the strand thus formed is wound into a suitable package or otherwise collected. In the present case the glass as it is flowed into the stream from which the fiber is attenuated is strung out into a multiplicity of minute streamlets each of exceedingly small diameter and by this operation the glass is hydraulically worked to be conditioned to provide the desired improved properties in the fiber. This working of the glass into minute streams causes all portions of the glass to be strung out into fine stria so that any aggregates of molecules are oriented so as to all extend in substantially the same direction and thus impart added strength to the fibers.

These aggregates of molecules apparently are the result of incipient crystallization, that is, the molecules have started to become oriented and collected in the position they would have if the glass were crystallized but this action has not proceeded to the crystalline state. Evidences of this precrystalline state or incipient crystallization have been observed in electron micrographs of very fine glass fibers. When fibers in the order of a few hundred thousandths of an inch in diameter are magnified twenty thousand times, it is observed that those fibers that are visible as translucent bodies show within the body a nodular arrangement with the nodules showing up as grayish blobs with fuzzy and indistinct borders, but nevertheless as dense zones of greater opacity than the areas between the zones.

Such dense zones apparently are molecular aggregates that are in the process of coming into the regular orientation that is characteristic of crystals. It may be that these nodules are not yet grown to crystalline dimensions but rather constitute crystal nuclei. These aggregates are herein referred to as incipient crystals and the effect is referred to as incipient crystallization.

When glass that is in this state of incipient crystallization is strung out into exceedingly fine streamlets, that is, streams having diameters in the order of a thousandth or less of an inch in diameter, these aggregates of molecules or incipient crystals may be strung out into oriented arrangements which contribute to increased strength and possibly also greater resistance to fracture of the glass. In the present invention this stringing out of the glass is accomplished by passing the glass as it flows to the fiber forming zone through minute passages or tubules which subdivide the glass into a multiplicity of fine streamlets which are then recombined into a larger stream which is immediately attenuated into a fiber.

The glass is rapidly cooling throughout this operation of subdivision, recombining and attenuation, so that any orientation imparted to the molecular structure of the glass is quickly frozen into the glass as the glass solidifies.

Referring to the drawings:

Figure 1 is an elevational view of one form of fiber forming operation to which the present invention applies;

Figure 2 is an enlarged cross sectional view of the feeder for feeding the streams of molten glass that are to be attenuated;

Figure 3 is a similar view but on a much larger scale showing two of the feeding orifices in the feeder;

Figure 4 is a similar view of one feeding orifice showing a somewhat modified construction;

Figure 5 is a perspective view of a part of the feeding device in the process of formation;

Figure 6 is a view of a preliminary form of a modification of such a part;

Figure 7 is a longitudinal sectional view of the finished form of such modified part;

Figure 8 is a perspective view of a further modification of such part; and

Figure 9 is a schematic cross sectional view of a feeder for the molten glass in which the glass in the feeder is adapted to be put under some pressure.

The present invention has utility wherever glass is converted into fabricated articles but it has particular utility in the manufacture of fibers from glass. And it can be applied to any of those processes where glass in molten state is flowed into small streams and these streams are then attenuated into fibers by the application thereto of suitable forces, for instance, by mechanically pulling the streams and attenuating them into fibers or by the application to the streams of a blast of gas or steam moving at high velocity in a manner to draw out the streams into fibers.

One such process of manufacturing glass fibers is shown schematically in Figure 1 where 10 represents the feeder from which the streams of molten glass flow, 11 represents the streams as they are drawn into fibers and 12 is a rotating spool onto which the fibers are wound in the form of a strand 13, which strand results from the collection of the fibers 11 into a bundle by means of a collecting device or guide 14.

The spool is mounted on a spindle 15 journaled in suitable bearings in a frame 16 which also supports a traversing device 18 comprising a rotating shaft 19 having thereon a series of strand engaging cams which move the strand laterally along the spindle 12 so as to be wound thereon in crisscrossed relation.

The feeder 10 is provided in its bottom wall with a plurality of feeding orifices 21 each of which extends through a nipple 22 protruding from the bottom wall of the feeder. A plurality of these nipples are arranged on the bottom wall usually with the nipples in rows and with several rows of such nipples running lengthwise of the feeder.

As shown in Figure 3 the orifice 21 through each nipple 22 has three portions, the first and upper one being the infeeding passageway 23 through which the molten glass flows on its way into the nipple, and by virtue of which the glass is divided into the streams that are attenuated into fibers. An intermediate passageway 24 adjoins the infeeding portion and in this passageway the stream of molten glass that is to be attenuated is divided into a multiplicity of minute streamlets. This passageway 24 is immediately followed by a tip section 25 in which the streamlets are recombined into a single stream which is then immediately attentuated as represented by the dotted lines 26 into a fiber. This tip section is as small as practicable so that a minimum of glass is retained therein, with the result that after recombination of the streamlets, the resulting glass stream is attenuated into a fiber before the condition imparted to the glass by the subdivision into streamlets can be altered. Toward this end it may be desirable in some cases to reduce the diameter of the tip passageway 25.

In the form of the invention shown in Figure 3 the small passages or tubules in the passageway 24 of the orifice through the nipple are in the form of very fine holes 29 that are drilled through the metal of the nipple. These tubules should be exceedingly fine openings preferably no larger than approximately three ten thousandths of an inch. As the glass flows through these tubules it is strung out into exceedingly small streams which effect an hydraulic working of the molten glass to properly condition it for obtaining the best properties in the finished fiber.

To obtain very fine passages through the nipple in a practical manner the construction shown in Figure 4 is desirable. Here the passageway that is made up of the fine passages is in a plug 31 that is inserted into a bore 33 in the nipple. This plug is preferably of the same metal of which the feeder proper is made, usually platinum or a platinum alloy, and the plug may be formed with an enlarged portion 34 at its upper end so as to prevent displacement of the plug downwardly in the bore of the nipple.

The plug 31 may be made in several ways as shown, for example in Figures 5, 6, 7 and 8. In Figure 5 the plug is disclosed as being made of a piece of corrugated metal foil, for instance, foil of about five thousandths of an inch in thickness and which is rolled up on itself so that the crests of the corrugations abut each other and the troughs of the corrugations are aligned with each other so that these aligned troughs form passages extending across the width of the foil and lengthwise through the resulting plug 31a. After the foil has been rolled up in this way the resulting plug 31a need only be inserted in the bore 33 in the nipple of the feeder.

Figures 6 and 7 depict a modified way of forming the plug having fine passages therethrough and illustrate a process in which a cylindrical piece of metal 41 is provided with a plurality of fine holes 42 drilled therethrough. These holes may be in the order of about 20 to 40 thousandths in diameter and one of this size may be drilled quite readily by conventional processes. After drilling the holes 42 are filled with molten glass, for instance, by submerging the cylindrical body 41 in a bath of molten glass heated to relatively low viscosity, say 300 or 500 centipoises. At low viscosity the molten glass fills the holes 42 and will remain therein when the plug is removed from the molten glass.

The cylindrical body 41 with the glass in the holes 42 is then forged in a conventional forging operation and preferably while heated to normal forging heat so as to be reduced substantially in diameter and drawn out into a slender cylinder. This forging operation is carried to the extent where the cylindrical body is reduced to as much as one one-hundredth of its original diameter. As an example, the cylindrical body 41 may originally be approximately three quarters inch in diameter with thirty thousandths holes drilled therethrough on fifty thousandths centers. By the forging operation this body is reduced to about fifty thousandths of an inch in diameter, representing a reduction in diameter of one hundred fifty times and, of course, the hole size being correspondingly reduced. The resulting cylindrical body 41 is then cut transversely into a plurality of plugs 31b which are then inserted into the bores 33 in the feeder shown in Figure 4. By this method extremely fine passages down to three ten thousandths of an inch diameter and even smaller can be obtained.

The plug 31c shown in Figure 8 represents a still further modification of the device and one providing for exceedingly fine passages in the plug. This Figure 8 shows a multiplicity of glass fibers gathered together into a compact bundle. The fibers are each coated with a metallic coating, such as a coating of gold or platinum or the like, applied by any suitable process as, for instance, by electro deposition. After the coated fibers are gathered together into a compact bundle they are held together under high pressure and simultaneously subjected to a heating operation, for instance, by being placed in a high frequency electrical field. The heating operation, combined with the pressure exerted on the bundle, welds the coated fibers together at their points of contact. After the welding operation the bundle of welded, coated fibers 44 is cut to the desired length and inserted in the bore 33 in the feeder shown in Figure 4. Subsequently when the feeder is placed in operation and heated to the temperature required to melt glass the glass fibers in the plug 31c are fused and the resulting molten glass flows from the plug leaving a plurality of exceedingly fine tubules through which the molten glass passes through the feeder.

In some cases it may be desirable to increase the pressure on the molten glass in the feeder to facilitate or increase the flow of glass through the fine passages in the orifices of the feeder. Toward this end any conventional pressure means may be employed, for instance, the application of air pressure to the interior of the bushing or preferably the depth of glass in the feeder may be substantially increased so as to exert a greater pressure at the feeding orifices, which are known procedures. Alternatively mechanical means may be employed to increase the pressure at the orifices as for instance by employing an apparatus similar to that shown in Figure 9. Here a feeder 10a is provided with a horizontally disposed interior wall 51 which partitions the interior of the feeder into an upper and lower chamber. A tubular channel 52 extends upwardly from the horizontal wall 51 and terminates at its upper end well below the level 53 of molten glass in the feeder. Located within the channel 52 is a screw 54 that is generally of the form of ordinary feeding or conveying screws and which is mounted on the lower end of a shaft 56 extending through the top of the feeder and at the outside of the feeder being provided with a sprocket 57 that has a suitable driving chain thereabout so as to apply power to the shaft 56 and thereby rotate the screw 54. Rotation of the screw 54 exerts pressure on the glass in the lower chamber to thereby increase the pressure on the glass at the orifices and facilitate flow of the molten glass therethrough.

Various modifications may be made in the present invention within the spirit and scope of the appended claims.

I claim:

1. Apparatus for forming glass fibers comprising a feeder for molten glass having a plurality of feeding orifices therein, means in said orifices for subdividing the glass flowing therethrough into a multiplicity of smaller streams, said means including a corrugated sheet of metal rolled on itself into a cylindrical body.

2. The process of making glass fibers comprising flowing from a body thereof a plurality of spaced-apart streams of molten glass to be attenuated into fibers, subdividing the individual streams each into a multiplicity of streamlets each less than one thousandth of an inch in diameter, recombining the streamlets into spaced-apart streams, and attenuating the resulting spaced-apart streams into fibers.

References Cited in the file of this patent

UNITED STATES PATENTS

| | | |
|---|---|---|
| 1,632,090 | McEvoy | June 14, 1927 |
| 1,796,571 | Mathieu | Mar. 17, 1931 |
| 1,926,552 | Morgan | Sept. 12, 1933 |
| 2,229,489 | Barnard | Jan. 21, 1941 |
| 2,257,767 | Slayter et al. | Oct. 7, 1941 |
| 2,266,349 | Wempe | Dec. 16, 1941 |
| 2,390,925 | Danner | Dec. 11, 1945 |
| 2,408,713 | Webb | Oct. 1, 1946 |
| 2,450,363 | Slayter et al. | Sept. 28, 1948 |
| 2,489,508 | Stalego | Nov. 29, 1949 |
| 2,535,888 | Billman | Dec. 26, 1950 |
| 2,553,692 | Webb | May 22, 1951 |
| 2,577,213 | Slayter et al. | Dec. 4, 1951 |
| 2,596,042 | Park | May 6, 1952 |

FOREIGN PATENTS

| | | |
|---|---|---|
| 647,913 | France | Aug. 6, 1928 |
| 1,003,082 | France | Nov. 14, 1951 |
| 381,582 | Great Britain | Sept. 29, 1932 |

OTHER REFERENCES

Serial No. 197,564, Wempe (A.P.C.), published April 27, 1943.